O. DAVIS.
AUTOMATIC BRAKE.
APPLICATION FILED NOV. 24, 1911.
1,040,520.
Patented Oct. 8, 1912.
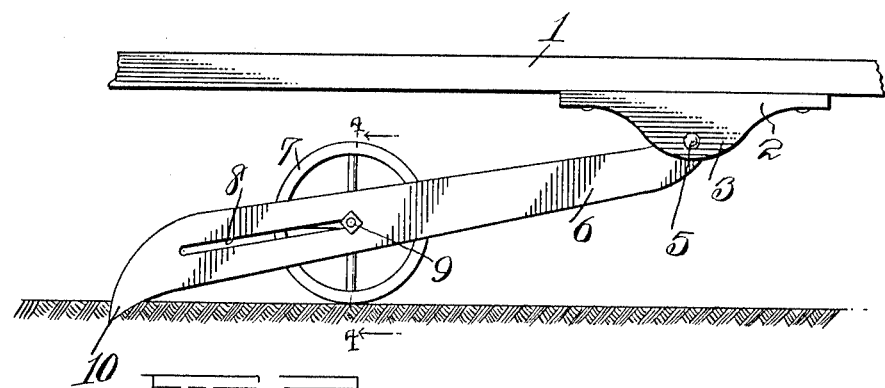
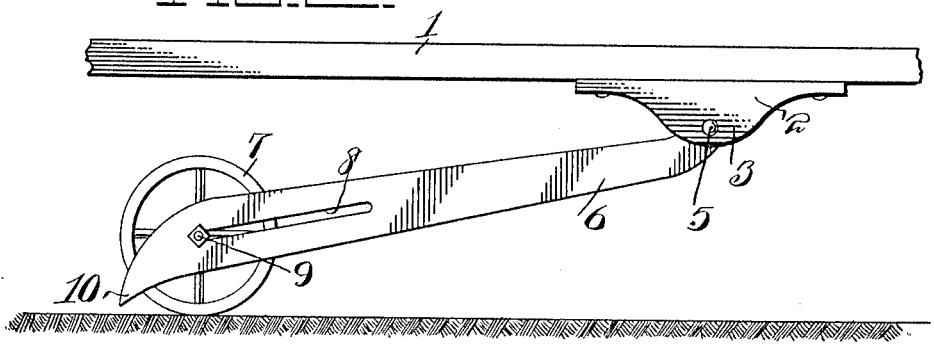
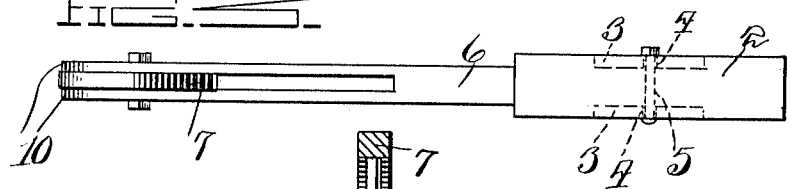
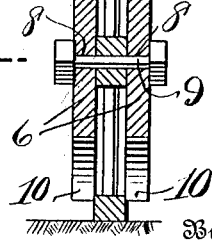
Witnesses
F. W. Taylor
Inventor
O. Davis.
By Harry Ellis Chandler
Attorney

UNITED STATES PATENT OFFICE.

OSCAR DAVIS, OF STEWART, OHIO.

AUTOMATIC BRAKE.

1,040,520.  Specification of Letters Patent.  Patented Oct. 8, 1912.

Application filed November 24, 1911. Serial No. 662,201.

*To all whom it may concern:*

Be it known that I, OSCAR DAVIS, a citizen of the United States, residing at Stewart, in the county of Athens and State of Ohio, have invented certain new and useful Improvements in Automatic Brakes, of which the following is a specification.

This invention relates to automatic brakes adapted for attachment to vehicles.

The invention has for its object to produce a device of this character which may be applied to the reach bar of a vehicle of any type, but is particularly adapted for wagons of heavy character, the same being so formed as to trail with the wagon to prevent the same from slipping backward upon stopping upon an incline.

With these and other objects in view, the invention consists in the construction and novel combination of parts hereinafter described, illustrated in the accompanying drawings, and pointed out in the claims hereto appended, it being understood that various changes in the form, proportion, size and minor details of construction within the scope of the claims may be resorted to without departing from the spirit or sacrificing any of the advantages of the invention.

In the drawing: Figure 1 is a side elevation of the device, showing the position of the same when in its operative position. Fig. 2 is a similar view, the device being shown in the position assumed when the vehicle is traveling. Fig. 3 is a top plan view of the device. Fig. 4 is a vertical sectional view on line 4—4 of Fig. 1.

Referring to the drawing, the numeral 1 designates the reach bar of the vehicle having bolted thereto and near the forward end thereof a block 2, said block being provided upon its under surface with a pair of oppositely disposed ears 3, said ears being formed with registered perforations 4.

Pivotally connected between the ears 3 by a pivot bolt 5 is the inner end of a bar 6, the same being formed from metal, and having its outer end bifurcated to accommodate the wheel 7. The bifurcated end of the bar 6 is provided with oppositely disposed and longitudinally arranged slots 8, and in which is supported the opposite ends of an axle 9, and upon which the wheel 7 is mounted for rotation.

The extreme outer ends of the bar 6 are curved downwardly to produce points 10, said points being adapted to engage the ground when in a position as shown in Fig. 1, and at which time the vehicle has moved backwardly thereby causing the axle 9 to travel forwardly in the slots 8 together with the wheel 7, thereby lowering the bar until the points 10 engage the ground, thus effectually braking the vehicle.

From this construction it will be seen that when the vehicle is traveling upon level ground the wheel 7 will be positioned as shown in Fig. 2 of the drawing, and at which time the points 10 and bar 6 are in their elevated position, due to the fact that the axle 9 is permitted to slide freely in the slots 8, to either raise or lower the bar and its points.

What is claimed is:

In combination with a vehicle including a reach bar, a block secured to said bar and provided with a pair of oppositely disposed ears, a bar having its inner end pivotally connected between said ears, the outer end of said bar being bifurcated and provided with a pair of longitudinally arranged slots, a wheel having an axle the opposite ends of which are slidably mounted in said slots, points formed upon the extreme outer end of said bar, said points being adapted to engage the ground when the vehicle is moved backwardly and the axle of said wheel travels forwardly in said slots.

In testimony whereof I affix my signature, in the presence of two witnesses.

OSCAR DAVIS.

Witnesses:
 JOHN FEATHERSTON,
 JOHN BALDERSON.

---

Copies of this patent may be obtained for five cents each, by addressing the "Commissioner of Patents, Washington, D. C."